United States Patent [19]
Hummer

[11] 3,836,157
[45] Sept. 17, 1974

[54] DOUBLE SHAFT SEAL WITH BALL DRIVE KEY

[75] Inventor: Herbert B. Hummer, Kalamazoo, Mich.

[73] Assignee: Durametallic Corporation, Kalamazoo, Mich.

[22] Filed: Jan. 29, 1973

[21] Appl. No.: 327,800

[52] U.S. Cl. .................................. 277/62, 277/87
[51] Int. Cl. ............................................. F16j 15/34
[58] Field of Search ......... 277/62, 61; 403/356, 355

[56] References Cited
UNITED STATES PATENTS

| | | | |
|---|---|---|---|
| 2,685,464 | 8/1954 | Murphy | 277/86 |
| 2,795,398 | 6/1957 | Ragland | 403/355 X |
| 3,066,942 | 12/1962 | Schwing | 277/62 |
| 3,484,113 | 12/1969 | Moore | 277/62 |
| 3,531,131 | 9/1970 | Hummer | 177/87 X |

*Primary Examiner*—Samuel B. Rothberg
*Attorney, Agent, or Firm*—Woodhams, Blanchard and Flynn

[57] ABSTRACT

A mechanical seal construction for sealing a shaft with respect to a housing. The seal construction includes a pair of opposed and substantially identical seal assemblies, disposed within a fluid chamber defined between the housing and the shaft. The pair of seal assemblies include a pair of rotatable seal units which are disposed directly opposite one another and are nonrotatably connected to the shaft by means of an intermediate collar. The shaft is provided with a substantially hemispherical recess in the periphery thereof, in which is disposed a ball. The collar has an axially elongated keyway of substantially rectangular cross section into which projects the ball. The keyway is defined by substantially parallel side walls which are spaced apart by a distance slightly greater than the diameter of the ball so that the ball engages the keyway at a substantially single point of contact to nonrotatably connect the collar to the shaft while permitting free axial displacement therebetween.

12 Claims, 3 Drawing Figures

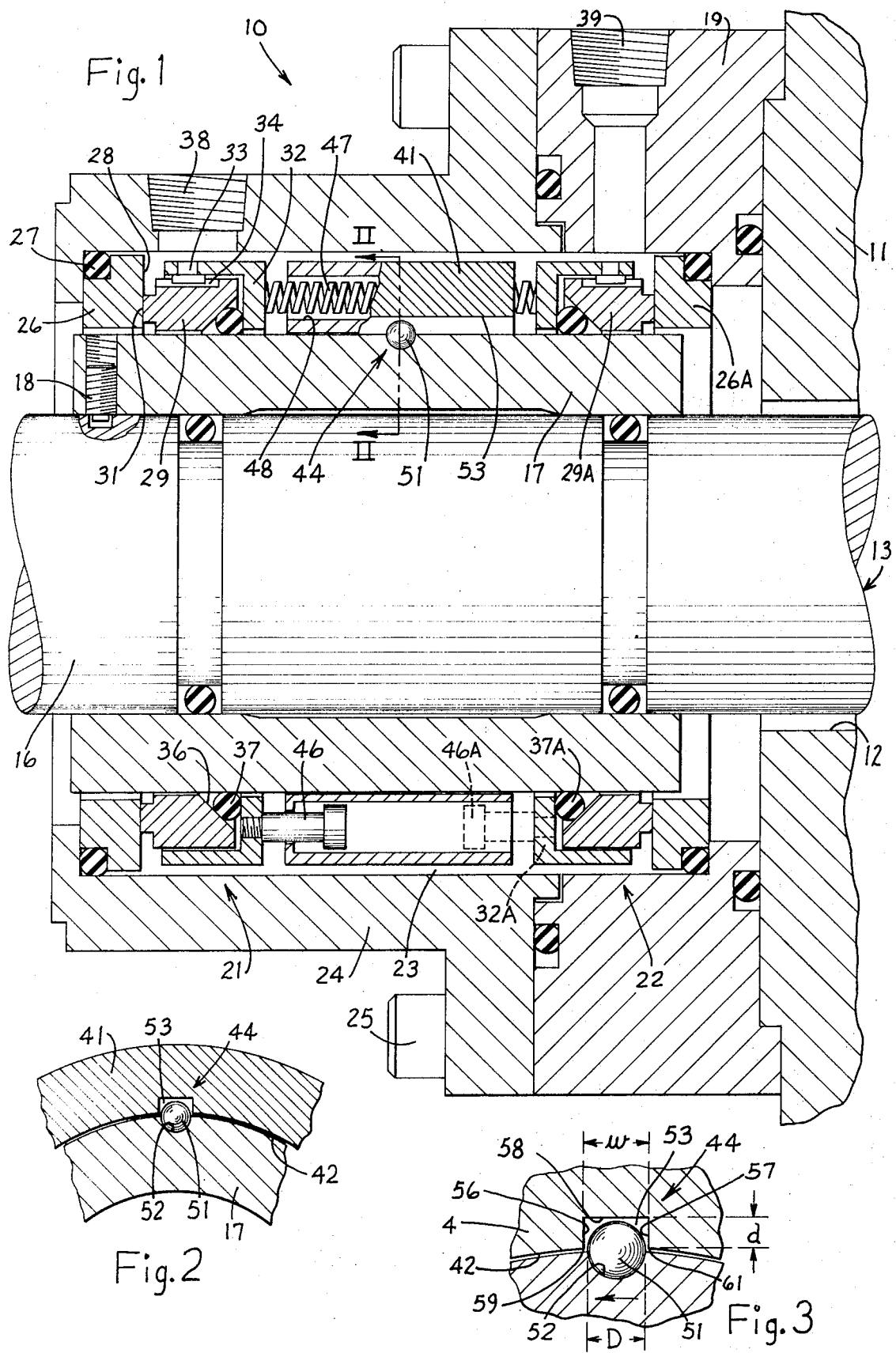

3,836,157

DOUBLE SHAFT SEAL WITH BALL DRIVE KEY

FIELD OF THE INVENTION

This invention relates to a mechanical seal structure for sealing a shaft with respect to a housing and, more particularly, to a double seal arrangement having an improved key structure for nonrotatably connecting a common seal collar to a rotatable shaft.

BACKGROUND OF THE INVENTION

Many different structures have been employed in the past to effect a sealing around a shaft to prevent leakage of both sealing fluid and operating fluid from an enclosure. One type of structure which has proven highly successful and desirable for this purpose involves the use of a mechanical seal construction having a pair of inside seal assemblies disposed for sealing coaction between the shaft and the enclosure. One such seal construction is illustrated in my prior U.S. Pat. No. 3,531,131.

However, it has been discovered that the above-mentioned mechanical seal constructions, in some use situations, do not permit the desired mode of operation. More specifically, many machines and devices requiring such seal assemblies also require substantial axial displacement of the shaft relative to the housing. This axial displacement may be caused by either pressure distortion or thermal expansion due to the high pressures and temperatures encountered during operation. For example, in some reactor applications, the shaft may axially expand by as much as one-half inch so that creating an effective and substantially leakproof seal between the shaft and the surrounding housing is thus extremely difficult. Further, certain other use applications require substantial axial adjustment of the shaft relative to the housing, such as is required by the impeller associated with the pump in a paper mill. This necessity of permitting or accommodating substantial axial displacement of the shaft relative to the housing thus makes use of conventional mechanical seal constructions extremely difficult due to the inability of these known seal constructions to accommodate such large amounts of relative axial movement.

In an attempt to provide a seal structure which will compensate for and/or permit the desired relative axial movement, mechanical seal constructions of the type disclosed in my above-mentioned patent have been provided for coaction between the housing and the shaft, with the driving collar for the rotatable seal units being keyed to the shaft by means of a conventional straight key and spline arrangement. While this key structure theoretically permits the desired relative axial movement, nevertheless it has been discovered that under actual operating conditions, the collar often tilts or cocks relative to the shaft, thereby causing the key structure to bind. Thus, instead of facilitating axial floating, this often substantially increases the friction so that the seal assembly is not able to freely axially float relative to the shaft, thereby actually restricting or preventing instead of permitting, the relative axial movement required during operation. The use of straight spline-type keys has thus proven totally unsatisfactory when large axial displacements are encountered, such as caused by the pressure distortion in a solid air dryer or by the thermal expansion in a reactor.

Accordingly, it is an object of the present invention to provide an improved seal construction which overcomes the above-mentioned disadvantages. More specifically, it is an object of the present invention to provide:

1. A mechanical seal construction, as aforesaid, which is capable of permitting a large amount of relative axial movement between the shaft and the housing without disturbing the sealed relationship therebetween.
2. A seal construction, as aforesaid, which provides a pair of seal assemblies coacting between the housing and the shaft and provided with an improved key structure coacting between the shaft and the rotatable seal units so as to permit the shaft to freely axially move relative to the seal units.
3. A seal construction, as aforesaid, wherein the two rotatable seal units include a common collar disposed between same and nonrotatably keyed to the shaft by said improved key structure, said collar and said key structure associated therewith permitting the shaft to relatively axially move through a rather substantial distance.
4. A seal construction, as aforesaid, wherein the key structure includes an intermediate key member associated with one of the shaft and collar so as to create a substantially single point of contact therewith to permit free relative axial displacement irrespective of tilting of the collar.
5. A seal construction, as aforesaid, wherein the collar is provided with an axially elongated groove of a substantially rectangular cross section, and wherein the key member comprises a ball seated within a hemispherical recess formed in the shaft, said ball projecting into said groove whereby a substantially single point of contact occurs between the collar and the ball so that binding of the collar on the key member is effectively prevented.
6. A seal construction, as aforesaid, wherein the groove has a width slightly greater than the diameter of the ball, and wherein the ball engages the external edge or corner of the groove to provide a substantially frictionless point-type engagement between the ball and the collar.
7. A seal construction, as aforesaid, wherein the key structure is highly effective for nonrotatably connecting the collar to the shaft but results in substantially negligible friction tending to resist relative axial movement between the collar and the shaft.
8. A seal construction, as aforesaid, which can be constructed in an efficient and economical manner, which is durable and dependable, and which permits a desired sealed relationship to be provided between a shaft and a housing, even in those situations where excessive relative axial movement of the shaft is necessary in order to compensate for pressure distortion, thermal expansion or desired axial adjustment.

Other objects and purposes of the present invention will be apparent to persons acquainted with devices of this type upon reading the following specification and inspecting the accompanying drawings.

BRIEF DESCRIPTION OF THE DRAWINGS

FIG. 1 is a central longitudinal sectional view taken through a mechanical seal construction according to the invention and shown in association with a shaft and a housing.

FIG. 2 is a fragmentary sectional view through the key structure as taken substantially along the line II—II in FIG. 1.

FIG. 3 is an enlargement of the key structure illustrated in FIG. 2 and illustrating the point-type engagement which exists between the ball and the collar.

In the following description, certain terminology will be used for convenience in reference only but will not be limiting. For example, the words "upwardly," "downwardly," "rightwardly" and "leftwardly" will refer to directions in the drawings to which reference is made. The words "inwardly" and "outwardly" will refer to directions toward and away from, respectively, the geometric center of the seal construction and designated parts thereof. Said terminology will include the words above specifically mentioned, derivatives thereof and words of similar import.

SUMMARY OF THE INVENTION

The object and purposes of the present invention, including those set forth above, have been met by providing a seal construction positioned within a chamber defined between a housing and a rotatable shaft projecting from the housing. The seal construction includes a pair of substantial identical seal assemblies disposed within the chamber and spaced axially along the shaft to create a sealed relationship between the shaft and the housing. Each seal assembly includes a stationary seal unit which is fixed relative to the housing and a rotatable sealing unit disposed in rotatable sliding sealing engagement with the fixed seal unit. The two rotatable seal units are axially opposed to one another and have a common collar disposed intermediate same, which collar is nonrotatably secured to the shaft by an improved key structure. More particularly, the collar has an axially elongated keyway of substantially rectangular cross section formed therein, and the shaft has a substantially hemispherical recess formed in the periphery thereof. A ball is seated in the recess and projects into said keyway for nonrotatably connecting the collar to the shaft while permitting the collar and the associated rotatable seal units to be freely axially displaced relative to the shaft through a substantial distance. The keyway is preferably defined by a pair of opposed and substantially parallel sidewalls which are spaced apart by a distance slightly greater than the diameter of the ball so that the ball engages one of the sidewalls at substantially a single point of contact, which point of contact is adjacent the external corner of the keyway whereby friction between the ball and the collar is minimized.

DETAILED DESCRIPTION

FIG. 1 illustrates therein a seal construction 10 used in conjunction with a housing or wall 11 having an opening 12 through which projects a rotatable shaft means 13. The shaft means 13, in the illustrated embodiment, comprises a shaft 16 having a sleeve 17 nonrotatably secured thereto by a key 18. However, shaft means 13 merely represents one type of shaft structure and it will be recognized that shaft means 13 can be of one piece and can be of substantially uniform diameter if desired.

To seal the shaft 13 relative to the wall 11, the seal construction 10 includes a pair of substantially identical seal assemblies 21 and 22 positioned in surrounding relationship to shaft means 13 and disposed within a chamber 23 formed within an annular housing 24. The housing 24 is secured to the wall 11 in a conventional manner, such as by bolts or screws 25. A conventional annular gland member 19 is fixedly held between the wall 11 and the housing 24.

The seal assemblies 21 and 22 are disposed in opposed and axially spaced relationship to each create an independent sealed relationship between the shaft and the surrounding stationary housing structure. Since the seal assemblies 21 and 22 are identical, only the seal assembly 21 will be described in detail, and parts of the seal assembly 22 will be identified by use of the same reference numerals used to identify the seal assembly 21 but with the reference letter "A" added thereto.

The seal assembly 21 includes a stationary seal ring 26 disposed in surrounding relationship to the shaft and positioned adjacent a shoulder formed on the forward end of the housing 24, being maintained in a stationary and sealed relationship relative thereto by an intermediate elastomeric seal ring 27. The stationary seal ring 26 has a substantially planar seal face 28 formed thereon and disposed in sliding sealing engagement with a similar planar seal face 31 formed on the end of a rotatable seal ring 29. The rotatable seal ring 29 is a part of a rotatable seal unit, which unit also includes an annular cup-shaped retainer member 32. Retainer 32 includes an annular flange portion which loosely surrounds the rotatable seal ring 29 and has a radially inwardly projecting drive pin 33 secured thereto and extending inwardly into an axially elongated slot 34 formed in the rotatable seal ring 29 for nonrotatably connecting same. The seal ring 29 also has a conical recess 36 formed in the other axial end thereof, which recess accommodates therein a packing ring 37. The ring 37 in the illustrated embodiment comprises an elastomeric O-ring of circular cross section. The O-ring 37 is clampingly and sealingly engaged between the shaft 17, the seal ring 29 and the retainer 32.

To nonrotatably connect the rotatable seal units of the seal assemblies 21 and 22 to the rotatable shaft 17, there is provided a sleevelike collar 41 surrounding the shaft 17. The collar 41 is disposed intermediate the rotatable seal units and, more specifically, intermediate the retainers 32 and 32A. The collar 41 defines therein an inner bore 42 having a diameter sufficiently greater than the external diameter of the shaft 17 to provide a substantial clearance therebetween. The collar 41 is in turn keyed to the shaft 17 by key means 44, which key means is designed to prevent relative rotation between the shaft 17 and the collar 41, while at the same time permit relative axial movement therebetween.

The collar 41 is in turn drivingly connected to the rotatable seal units by means of drive pins 46 and 46A, which drive pins are mounted on the collar and disposed within suitable bores or recesses formed therein, with the outer ends of the drive pins 46 and 46A being fixedly connected to the retainers 32 and 32A, respectively. A plurality of pins 46 and 46A are substantially equally angularly spaced around the collar 41 and are drivingly connected to the retainers 32 and 32A.

The collar 41 also supports thereon a plurality of angularly spaced compression springs 47, which springs coact with the seal assemblies 21 and 22 for resiliently urging the rotatable seal units into snug rotatable sliding engagement with the stationary seal rings 26 and 26A. In the illustrated embodiment, each spring 47 is disposed within a bore 48 which extends axially through the collar 41, whereupon the opposite ends of the spring are disposed in engagement with the retainers 32 and 32A. However, in some situations it is desirable to provide separate springs disposed in engagement with the retainers 32 and 32A, whereupon the springs will then be seated within blind bores formed in the collar 41.

Considering now the key means 44, same includes a spherical key member, specifically a ball 51, seated within a hemispherical recess 52 formed in the periphery of the shaft 17. The hemispherical recess 52 is generated about a radius substantially equal to the radius of the ball 51 so that one half of the ball 51 is thus snugly but rotatably seated within the recess 52. The remaining half of the ball 51 projects into an axially elongated groove or keyway 53 which is formed in the collar 41 and projects radially outwardly from the inner wall 42. The keyway 53, as illustrated in FIGS. 2 and 3, is of a substantially rectangular cross section and includes a pair of flat and substantially parallel sidewalls 56 and 57 interconnected adjacent their inner ends by a bottom wall 58. The bottom wall 58 in the illustrated embodiment is substantially planar and substantially perpendicular to the sidewalls 56 and 57. The other edges of the sidewalls 56 and 57, where they meet the inner periphery or inner wall 42, define rather sharp corners 59 and 61, respectively.

The keyway 53, as illustrated in FIG. 3, has a width $w$ defined between the sidewalls 56 and 57, which width $w$ is preferably slightly greater than the diameter D of the ball 51. The keyway 53 has a depth $d$ which is at least equal to one half the diameter D of the ball 51, and the depth $d$ is preferably slightly greater than one half the diameter D of the ball 51. However, the depth $d$ is always substantially less than the diameter D of the ball.

In one practical embodiment of the invention, the ball has a diameter D of one-quarter inch, and the keyway 53 has a width $w$ of nine thirty-seconds inch and a depth $d$ of five thirty-seconds inch. Further, as stated above, the hemispherical recess 52 has a diameter substantially equal to the diameter of the ball, namely one-quarter inch. By dimensioning the ball 51, the recess 52 and the keyway 53 as described above, and as typified by the exemplary dimensions given above, the ball 51 is thus confined by the keyway so as to always remain disposed in the recess 52. Thus, the ball 51 can not escape from the overall collar and shaft assembly. Further, these dimensional limitations also result in the ball 51 engaging the collar 41 at only a single point of contact.

Due to the point-type engagement between the ball 51 and the keyway 53, the ball 51 is preferably constructed from a hardened and heat-treated steel and is provided with a highly finished exterior surface. For this purpose, the ball 51 preferably comprises a ball which is identical to the balls utilized for ball bearings and, in fact, conventional bearing balls of appropriate diameter can be utilized.

OPERATION

The seal assemblies 21 and 22 operate in a substantially conventional manner in that the springs 47 urge the retainers 32 and 32A toward their respective seal rings 29 and 29A. The spring force thus resiliently compresses the packing rings 37 and 37A into sealing engagement with the shaft and the opposed faces formed on the retainer and the rotatable seal ring. The rotatable seal rings 29 and 29A are also resiliently urged into rotatable sliding engagement with the stationary seal rings 26 and 26A.

During rotation of the shaft means 13, the rotation is transmitted through the ball 51 to the collar 41, which in turn drives the rotatable seal units synchronously with the shaft means due to the intermediate drive pins 46 and 46A. However, the rotatable seal units are sufficiently spaced from the periphery of the shaft (except for the sealing engagement between the seal rings 37 and 37A with the shaft) so as to permit the shaft 17 to freely axially move relative to the rotatable seal units. Similarly, the provision of the key means 44 between the collar 41 and the shaft means 13 also permits the shaft means to freely axially move relative to the collar 41.

More specifically, the rotatable driving engagement between the shaft means 13 and the collar 41 results in the ball 51 being moved into engagement with one of the sidewalls 56 or 57, the ball 51 as illustrated in FIG. 3 being disposed in torque transmitting and driving engagement with the sidewall 56. Since the keyway 53 has a width greater than the diameter of the ball 51, the ball 51 engages only one sidewall, such as the sidewall 56. Further, since the depth $d$ of the keyway 53 is selected so as to be slightly greater than one-half the diameter of the ball, this results in the bottom wall 58 being spaced from the ball but being positioned closely enough thereto to prevent the ball from leaving the recess 52. This relationship thus results in the ball and the walls defining the keyway contacting one another at substantially a single point. This single point of contact thus greatly minimizes and substantially eliminates the frictional forces which exists between the keyway and the ball so that the collar 41 and the shaft means 13 can be freely axially moved relative to one another. The shaft 13 is thus freely axially movable through large distances, such as in the order of one-half inch. Further, due to the single point of contact between the ball 51 and the collar 41, any tilting or cocking of the collar 41 relative to the shaft does not result in any binding between the ball and the collar so that relative axial movement between the collar and the shaft is not restricted.

Further, due to the manner in which the ball 51 coacts between the recess 52 and the keyway 53, the point of contact between the ball and the surrounding collar occurs not only at a single point, but also occurs substantially at the sharp corner which defines a free edge of the keyway, such as the corner 59 illustrated in FIG. 3. Since the point of contact occurs on a relatively sharp corner, which sharp corner in turn engages the cylindrical exterior surface of the ball, the area of contact thus closely approaches a point so that the area of contact and the resulting friction caused by the contact is extremely small.

Since a suitable fluid, such as water or lubricant, is supplied through the openings 38 and 39 into the immediate vicinity of the seals 21 and 22, which fluid also substantially fills the portion of the chamber 23 surrounding the rotatable seal units, this fluid also enters the keyway 53 and surrounds the ball 51. The fluid thus effectively assists in lubricating the ball and the keyway so that the friction is still further minimized, and the wear on the ball and keyway is further decreased. Also, due to the extremely small contact area between the ball and the keyway, it is believed that the fluid tends to create a partial hydro-dynamic cushion at the point of contact between the ball and the keyway so as to minimize both wear and friction.

As regards the formation of the keyway 53, same is preferably provided with substantially parallel sidewalls 56 and 57, as illustrated. However, it must be recognized that the sidewalls could be disposed at a slight angle relative to one another so as to relatively diverge as they extend inwardly toward the shaft. This slight divergence would still result in the desirable point-type contact between the ball and the keyway. With respect to the bottom wall 56, this bottom wall may have any desired configuration so long as it is normally maintained out of engagement with the ball while at the same time being spaced sufficiently close to the ball to prevent the ball from escaping from the recess 52. The use of a rectangular cross section for the keyway 53, as illustrated and described, is preferred since this thus permits the keyway to be formed in an efficient manner, such as by utilizing a broach for machining the axially elongated keyway in the collar.

Although a particular preferred embodiment of the invention has been disclosed above for illustrative purposes, it will be understood that variations or modifications thereof which lie within the scope of the appended claims are fully contemplated.

The embodiment of the invention in which an exclusive property or privilege is claimed are defined as follows:

1. In a mechanical seal construction for use between a wall and a shaft member extending through the wall and rotatable relative thereto, the seal construction having a pair of seal elements having mutually contacting sealing faces, one seal element being fixed with respect to the wall and the other seal element being capable of rotation in response to rotation of the shaft member, a collar member surrounding the shaft member and interconnected to the rotatable seal element for synchronous rotation therewith, and key means coacting between the collar member and the shaft member for nonrotatably interconnecting same while permitting relative axial movement therebetween, comprising the improvement wherein said key means includes a substantially hemispherical recess formed in one of said members, an axially elongated groovelike keyway formed in the other of said members, and a ball having a radius substantially equal to the radius of said recess, said ball being freely rotatably seated within said hemispherical recess and projecting into said keyway, said keyway being defined by a pair of opposed sidewalls which are substantially flat relative to the curvature of said ball, and said ball engaging one of said sidewalls by means of a pointlike contact adjacent the outer edge of said one sidewall.

2. A seal construction according to claim 1, wherein said sidewalls are substantially planar.

3. A seal construction according to claim 2, wherein said recess has a depth substantially equal to the radius of said ball, and wherein said keyway has a depth slightly greater than the radius of said ball but less than the diameter of said ball so that the bottom of said recess is normally spaced from said ball but prevents said ball from escaping from said recess.

4. A seal construction according to claim 2, wherein said keyway has a substantially rectangular cross section, and wherein said sidewalls are substantially parallel with one another.

5. A seal construction according to claim 4, wherein said parallel sidewalls are spaced apart by a distance slightly greater than the diameter of said ball so that said ball contacts only one of said sidewalls at any one time.

6. A seal construction according to claim 5, wherein said keyway has a depth slightly greater than the radius of said ball but less than the diameter of said ball so that the bottom wall of said recess is spaced from said ball but prevents said ball from escaping from said recess.

7. A seal construction according to claim 1, wherein said sidewalls are substantially parallel and planar and project substantially radially relative to said shaft member, and said ball engaging one of said sidewalls adjacent the free edge thereof so that said ball engages said keyway substantially at a sharp corner.

8. A seal construction according to claim 7, wherein said keyway is formed in said collar member, and wherein said hemispherical recess is formed in said shaft member.

9. In a mechanical seal construction for use between a housing and a shaft extending through and rotatable relative to the housing, said seal construction including a pair of substantially identical seal assemblies disposed in surrounding relationship to said shaft and disposed opposite and axially spaced from one another, each seal assembly including a rotatable seal unit nonrotatably interconnected to said shaft and disposed in relative rotatable sealing engagement with a fixed seal unit which is nonrotatable relative to said housing, the rotatable seal units of said pair of seal assemblies being disposed directly opposite and axially spaced from one another, the improvement comprising:

an annular sleevelike collar member spaced intermediate said rotatable seal units and disposed in surrounding relationship to said shaft, said collar member having means associated with the opposite axial ends thereof for nonrotatably connecting same to said rotatable seal units; and key means coacting between said collar member and said shaft for nonrotatably interconnecting said collar member to said shaft while permitting free relative axial movement therebetween, said key means including a concave recess formed in the periphery of said shaft and a ball member seated within said recess, said ball member projecting outwardly a substantial distance beyond the periphery of said shaft;

said key means further including an elongated groovelike keyway formed in said collar member and projecting axially thereof, said keyway projecting radially inwardly into said collar member from the inner peripheral wall thereof and including a pair of opposed and substantially planar sidewalls disposed for engagement with said ball member, whereby engagement of said ball member with one of said sidewalls results in a pointlike contact area.

10. A seal construction according to claim 9, wherein said planar sidewalls are disposed substantially parallel to one another and spaced apart by a distance slightly greater than the diameter of said ball member, said ball member contacting only one of said sidewalls at the free edge thereof so that said ball member engages said keyway at a sharp corner.

11. A seal construction according to claim 1, wherein said keyway communicates with an annular peripheral surface formed on said other member, the outer edge of each said sidewall where it joins said annular peripheral surface defining a substantially sharp corner, and said ball engaging said other member at said sharp corner to define said pointlike contact area therebetween.

12. In a mechanical seal construction for use between a wall and a shaft member extending through the wall and rotatable relative thereto, the seal construction including a pair of seal elements having mutually contacting sealing faces, one seal element being fixed to the wall and the other seal element being capable of rotation in response to rotation of the shaft member, a collar member surrounding the shaft member and interconnected to the rotatable seal element for synchronous rotation therewith, and key means coacting between the collar member and the shaft member for nonrotatably interconnecting same, comprising the improvement wherein said key means includes a ball, recess means formed in one of said members and having said ball freely rotatably seated therein, said recess means having walls which engage said ball for preventing displacement of said ball in the circumferentially extending direction of said one member while enabling said ball to be seated within said recess means to a depth substantially equal to the radius of said ball, and keyway means formed in the other of said members for engaging said ball at a pointlike contact area defined by a substantially sharp corner, said keyway means comprising an axially elongated groovelike keyway defined by a pair of opposed sidewalls which are substantially flat relative to the curvature of said ball, each of said sidewalls terminating in an outer edge which defines a substantially sharp corner, and said ball projecting into said keyway and engaging said other member solely at one of said sharp corners so as to define said pointlike contact area therebetween.

* * * * *